US012607491B2

(12) United States Patent
Jung et al.

(10) Patent No.: US 12,607,491 B2
(45) Date of Patent: Apr. 21, 2026

(54) ULTRASONIC WATER METER FLOW MEASUREMENT AND OUTDOOR WATER LEAK DETECTION METHOD USING TEMPERATURE DISTRIBUTION AND PRESSURE CHANGE, AND THEREOF THE ULTRASONIC WATER METER

(71) Applicant: HITECNSOL CO., LTD, Seoul (KR)

(72) Inventors: Kwang Uk Jung, Hanam-si (KR); Tae Chul Shin, Anyang-si (KR); Ji Won Kim, Seoul (KR); Min Sung Park, Seoul (KR); Dong Kyu Kim, Seoul (KR); Won Jung Lee, Seoul (KR)

( * ) Notice: Subject to any disclaimer, the term of this patent is extended or adjusted under 35 U.S.C. 154(b) by 0 days.

(21) Appl. No.: 19/104,665

(22) PCT Filed: Feb. 21, 2024

(86) PCT No.: PCT/KR2024/002249
§ 371 (c)(1),
(2) Date: Feb. 18, 2025

(87) PCT Pub. No.: WO2025/146865
PCT Pub. Date: Jul. 10, 2025

(65) Prior Publication Data
US 2025/0264348 A1     Aug. 21, 2025

(30) Foreign Application Priority Data
Jan. 2, 2024    (KR) ........................ 10-2024-0000514

(51) Int. Cl.
*G01F 1/667*        (2022.01)
*G01F 1/34*         (2006.01)
(Continued)

(52) U.S. Cl.
CPC ................ *G01F 1/668* (2013.01); *G01F 1/34* (2013.01); *G01F 15/063* (2013.01); *G01M 3/02* (2013.01)

(58) Field of Classification Search
CPC .......... G01F 1/668; G01F 1/34; G01F 15/063; G01M 3/02
(Continued)

(56) References Cited

U.S. PATENT DOCUMENTS

| | | | |
|---|---|---|---|
| 2004/0006436 A1* | 1/2004 | Morgen ................. | G01F 1/663 |
| | | | 702/48 |
| 2022/0049478 A1* | 2/2022 | Mason ................ | G01M 3/2815 |

(Continued)

FOREIGN PATENT DOCUMENTS

| | | |
|---|---|---|
| JP | 2001-249039 A | 9/2001 |
| JP | 2017-111140 A | 6/2017 |

(Continued)

OTHER PUBLICATIONS

International Search Report of PCT/KR2024/002249 filed on Feb. 21, 2024.
Written Opinion of PCT/KR2024/002249 filed on Feb. 21, 2024.

*Primary Examiner* — Peter J Macchiarolo
*Assistant Examiner* — John M Royston

(57)          ABSTRACT

A method for measuring water flow amount and for detecting an outdoor water leakage using temperature distribution and pressure change in a ultrasound water meter includes: a ultrasound time measurement process; a water flow rate calculation process; a ultrasound speed calculation process; a center water temperature calculation process; a water surface temperature measurement process; a temperature distribution calculation process; a water movement pattern determination process; and a water flow amount calculation process.

9 Claims, 8 Drawing Sheets

(51) Int. Cl.
    *G01F 15/063* (2022.01)
    *G01M 3/02* (2006.01)
(58) Field of Classification Search
    USPC .......................................................... 73/861.27
    See application file for complete search history.

(56) References Cited

U.S. PATENT DOCUMENTS

| | | | |
|---|---|---|---|
| 2022/0051351 A1* | 2/2022 | Mason ..................... | G01F 1/662 |
| 2022/0170770 A1* | 6/2022 | Nakabayashi .......... | G01F 15/00 |
| 2022/0291066 A1* | 9/2022 | Krywyj ................. | G01M 3/243 |

FOREIGN PATENT DOCUMENTS

| | | |
|---|---|---|
| JP | 2003-035625 A | 2/2024 |
| KR | 10-2002-0053717 A | 7/2002 |
| KR | 10-1888188 B1 | 8/2018 |
| KR | 10-2116651 B1 | 5/2020 |

* cited by examiner

Laminar flow

| Temp. t (°C) | Viscosity μ(centi-poise) | Density [g/cm³] | Coefficient of kinematic viscosity ν (centi-stokes) |
|---|---|---|---|
| 0 | 1.7921 | 0.99987 | 1.7923 |
| 1 | 1.7320 | 0.99993 | 1.7321 |
| 2 | 1.6740 | 0.99997 | 1.6741 |
| 3 | 1.6193 | 0.99999 | 1.6193 |
| 4 | 1.5676 | 1.00000 | 1.5676 |
| 5 | 1.5188 | 0.99999 | 1.5188 |
| 6 | 1.4726 | 0.99997 | 1.4726 |
| 7 | 1.4288 | 0.99993 | 1.4288 |
| 8 | 1.3872 | 0.99988 | 1.3874 |
| 9 | 1.3476 | 0.99981 | 1.3470 |
| 10 | 1.3097 | 0.99973 | 1.3101 |
| 11 | 1.2735 | 0.99963 | 1.2740 |
| 12 | 1.2390 | 0.99952 | 1.2396 |
| 13 | 1.2061 | 0.99940 | 1.2068 |
| 14 | 1.1748 | 0.99927 | 1.1756 |
| 15 | 1.1447 | 0.99913 | 1.1457 |
| ⁚ | ⁚ | ⁚ | ⁚ |
| 20 | 1.0087 | 0.99823 | 1.0105 |
| 21 | 0.9843 | 0.99802 | 0.9863 |
| 22 | 0.9608 | 0.99780 | 0.9629 |
| 23 | 0.9380 | 0.99757 | 0.9403 |
| 24 | 0.9161 | 0.99733 | 0.9186 |
| 25 | 0.8949 | 0.99707 | 0.8975 |
| ⁚ | ⁚ | ⁚ | ⁚ |
| 30 | 0.8004 | 0.99568 | 0.8039 |
| 31 | 0.7834 | 0.99537 | 0.7870 |
| 32 | 0.7670 | 0.99505 | 0.7708 |
| 33 | 0.7511 | 0.99473 | 0.7551 |
| 34 | 0.7357 | 0.99440 | 0.7398 |
| 35 | 0.7208 | 0.99406 | 0.7251 |
| ⁚ | ⁚ | ⁚ | ⁚ |
| 39 | 0.6661 | 0.99262 | 0.6711 |

Fig. 6

ULTRASONIC WATER METER FLOW MEASUREMENT AND OUTDOOR WATER LEAK DETECTION METHOD USING TEMPERATURE DISTRIBUTION AND PRESSURE CHANGE, AND THEREOF THE ULTRASONIC WATER METER

CROSS-REFERENCE TO RELATED APPLICATION

This application is the National Stage of International Application No. PCT/KR2024/002249, filed on Feb. 21, 2024, which claims the benefit of and priority to Korean Patent Application No. 10-2024-0000514 filed on Jan. 2, 2024, which are herein incorporated by reference in its entirety.

TECHNICAL FIELD

The present invention relates to a method for measuring water flow rate in an ultrasound water meter. More specifically, the present invention relates to a method for measuring water flow rate in an ultrasound water meter and detecting water leaks by using temperature distribution and pressure change. The present invention analyzes water movement patterns and applies different water flow rates to different water movement patterns to precisely calculate water flow amount.

TECHNICAL BACKGROUND

Impeller water meters have disadvantages such as pressure loss due to physical friction, inability to detect low-speed water flow, errors due to impeller floating problems, and impeller durability problems. Recently, ultrasound meters that overcome these disadvantages have been used.

An ultrasound meter is a device that measures water flow rate by detecting water flow d in a pipe using ultrasound waves. It is also widely used since the ultrasound sensor can be installed on the outside of the pipe, and it can easily measure the flow rate, However, ultrasound water meters cannot accurately measure water flow rate because it measures solely a central water flow rate and ignores the difference in water flow rate depending on water movement patterns such as laminar/transitional/turbulent movement. In addition, water temperature distribution in the water pipe also changes with the seasons, which causes errors in water flow rate measurement.

Korean Patent No. 10-2116651 (hereinafter, conventional art) discloses a method for measuring water flow rate using an ultrasound water meter. The method is proposed to improve accuracy of water flow rate measurement by using a water flow rate correction coefficient. First, a ratio (or a function) of the frictional force over the inertial force of water and pipes is obtained. Then, the linear water flow rate is corrected to an average water flow rate using the ratio (or function) to obtain a more precise water flow amount.

The propagation time of ultrasound waves varies depending on the water temperature. The water flow rate measurement method according to the conventional art calculates water temperature by using the fact that the propagation time of ultrasound waves varies depending on the water temperature; calculates the viscosity of water according to the water temperature; and sets a water flow rate correction coefficient; and correct the water flow rate measurement error using the water flow rate correction coefficient. (Error correction is made considering the laminar movement characteristics of water)

However, as shown in FIG. 1, water temperature inside the water pipe varies depending on the measurement location and depending on the surrounding environment.

The water temperature distribution is not uniform inside the water pipe changes due to the difference in temperature between inside the water pipe and outside the water pipe. Thus, water temperature distribution cannot be precisely determined by using only the water flow rate located at a center of the pipe. Therefore, inaccurate temperature measurements lead to errors in calculating the water flow rate, which in turn leads to errors in water flow amount measurement.

Ultrasound water meters, which are greatly affected by water temperature, cannot help but cause significant errors in water flow rate measurement due to not considering water temperature or due to inaccurate water temperature measurement. (The speed of ultrasound waves changes depending on the water temperature.)

FIG. 1 shows the change in temperature distribution according to the temperature difference inside and outside of a water pipe. As shown in FIGS. 2 and 3, water flows laminar or turbulent in water pipes (there is also transitional flow, which is a composite form of laminar and turbulent flow), and accordingly, a difference in water flow rate occurs between an inner surface and a center of the water pipe. Failure to take this difference into account will result in errors in water flow amount measurement.

The method of measuring the water flow rate of the ultrasound water meter according to conventional art does not consider water movement patterns and sets the correction coefficient value assuming that the water movement pattern is laminar. See FIG. 2, So, errors in water flow rate measurement occur when the water movement pattern is turbulent or transitional. See FIG. 3.

FIGS. 2 and 3 show water flow distribution in a water pipe. FIG. 2 shows laminar water movement. FIG. 3 shows turbulent water movement. In this way, conventional flow rate measurement methods cause many errors in water flow rate measurement due to not considering water temperature distribution or inaccurate water temperature measurement.

On the other hand, while it is possible to detect water leaks inside the home through real-time monitoring of water usage, there is a need for a low-cost, real-time monitoring method for water leaks outside the home.

Korean Patent No. 10-1888188, which is directed to an ultrasound water meter capable of detecting water leaks, a water leak detection system equipped with the same, and a water leak location detection method using the same, analyzes a signal from a water leak sound detection sensor to determine whether a water leak has occurred and its location.

However, such a conventional water leak detection system must use an expensive water leak sound detection sensor. In addition, since water meters use ultra-low-capacity, low-power communication networks, they are not suitable for transmitting high-volume data such as water leak sound detection signals. Therefore, a separate water leak detection system must be built and a person must visit the site in person to determine whether there is a water leak.

In addition, since the location of the leak is detected by determining the leak sound, accurate detection is difficult due to the influence of groundwater noise, surrounding noise, etc.

Water meters are designed to correct errors in minimum/maximum/transition water flow amount before product shipment. However, in real environments, not in laboratory environments, water movement patterns change depending on the surrounding environment, water temperature distribution, and water flow rate. Conventional flow measurement methods cannot correct errors by taking all of these variables into account. In addition, due to the absence of a real-time monitoring system for outdoor water leaks, actual water leak occurs often and responses are slow, resulting in a decrease in water flow amount.

SUMMARY OF INVENTION

The present invention provides a method for measuring flow rate and detecting outdoor water leaks using temperature distribution and pressure changes of an ultrasound water meter, which enables accurate flow rate measurement in an ultrasound water meter by distinguishing the flow of water in a water pipe, calculating an average flow rate according to the water flow, and measuring the flow rate using the calculated average flow rate.

To determine a precise average water flow rate which varies depending on water movement pattern, you need to know the Reynolds number. To obtain the Reynolds number, you need to know the average water flow rate. The Reynolds number varies depending on water temperature.

Therefore, to obtain a precise water flow amount, a method is needed to determine whether a given water flow is laminar, transitional, or turbulent and to apply different average water flow rate to different water movement patterns.

An ultrasound water meter according to the present invention measures water flow amount and detects water leakage by considering temperature changes according to the surrounding environment. Specifically, the ultrasound water meter obtains water temperature distribution, average water temperature, water flow rate distribution, and average water flow rate in a water pipe. Then, the ultrasound water meter obtains the Reynolds number to determine the water movement pattern to calculate water flow amount.

In addition, when determining the water movement pattern in the present invention, it is essential to check for leakage in order to prevent errors due to leakage. The leakage can be detected by using a pressure sensor.

Whether there is a leak can be found by continuously checking whether there is a pressure drop in the water pipe. When there is no water flow in the water pipe at a given point of time, occurrence of a leak can be detected by comparing a first pressure and a second pressure. The first pressure is measured when there is no water flow in the water pipe at a given time, wherein the second pressure is measured when there is no water flow in the water pipe at the time of initial installation;

The method for measuring flow rate and detecting outdoor water leaks of an ultrasound water meter of the present invention measures water flow amount considering water movement pattern using temperature distribution. Specifically, water flow rate distribution and average water flow rate vary depending on the water movement pattern. With this in mind, the present invention determines the water movement pattern using the Reynolds number to which the average temperature is applied. Then, the average water flow rate is differently determined depending on the water movement pattern. The water flow amount can be calculated using the average water flow rate. According to this method, the water flow amount can be accurately calculated.

According to an embodiment of the present invention, a method for measuring water flow amount and for detecting water using temperature distribution includes: a ultrasound time measurement process that measures a ultrasound time, wherein the ultrasound time includes a forward ultrasound time and a backward ultrasound time, wherein the forward ultrasound time detects ultrasound moving in the same direction as a water flowing direction, wherein the backward ultrasound time detects ultrasound moving in the opposite direction to the water flowing direction; a water flow rate calculation process that calculates a water flow rate in the water pipe using a difference between the forward ultrasound time and the backward ultrasound time; a ultrasound speed calculation process that calculates a ultrasound speed using the forward ultrasound time and the backward ultrasound time obtained in the ultrasound measurement process; a center water temperature calculation process that calculates water temperature $T(0)$ of water located in a center of the water pipe using the ultrasound speed obtained in the ultrasound speed calculation process; a water surface temperature measurement process that detects a water surface temperature $(Ts)$; a temperature distribution calculation process that calculates a water temperature distribution $T(r)$ in the water pipe using the water surface temperature, the center water temperature $T(0)$, and a water pipe diameter; a water movement pattern determination process that determines a water movement pattern using the water temperature distribution $T(r)$, a water flow rate distribution, and comparison between a first Reynolds number and a second Reynolds number, wherein the water flow rate distribution is obtained using the ultrasound time and varies depending on the water movement pattern, wherein the first Reynolds number is calculated using an average water flow rate, wherein the second Reynolds number is calculated using a pressure change in the water pipe, wherein the pressure change is obtained using a pressure sensor; and a water flow amount calculation process that calculates a water flow amount using the average water flow rate, wherein the average water flow rate varies depending on the water movement pattern.

The water movement pattern determination process includes a first process and a second process. The first process includes: calculating the water temperature distribution $T(r)$, a water temperature distribution $u(r)$, and average water flow rate, wherein the water temperature distribution $u(r)$ varies depending on the water movement pattern; calculating an average water temperature $Tm$, wherein the average water temper $Tm$ varies depending on the water movement pattern; obtaining the first Reynolds number using the average water temper $Tm$; obtaining the average water flow rate and the second Reynolds number using the pressure change obtained using the pressure sensor; and determining whether a given water movement pattern is a laminar movement or a turbulent movement by comparing the first Reynolds number and the second Reynolds number. The second process determines the given water movement as a transitional movement flow when the given water movement is neither the laminar movement nor the turbulent movement.

The water movement pattern determination process determines the water flow movement pattern as a laminar movement when the first and second Reynolds numbers are $Re \leq 2300$, respectively, and the difference between the first and second Reynolds numbers is within a preset error range. The water movement pattern determination process determines the water flow movement pattern as turbulent movement when the first and second Reynolds numbers are Re≥4000, respectively, and the difference between the first and second Reynolds numbers is within the preset error range. The water movement pattern determination process determines the water flow movement pattern as turbulent movement when the first and second Reynolds numbers are 2300〈Re〈4000, respectively, and the difference between the first and second Reynolds numbers is within the preset error range. The number n keeps changing until the difference between the first and second Reynolds numbers falls within the preset error range.

The method may further includes a water leak monitoring process. The water leak monitoring process includes: monitoring whether there is no water flow in the water pipe using the water flow rate obtained in the water flow rate calculation process; comparing a first pressure (P1) and a second pressure (P2) detected by a pressure sensor, wherein the first pressure (P1) is measured when there is no water flow in the water pipe at the time of initial installation, wherein the second pressure (P2) is measured when there is no water flow in the water pipe at a given point of time; determining whether there is a pressure drop that exceeds a preset reference error value; generating water leak monitoring information when a pressure drop exceeds the preset reference error value; and transmitting the water leak monitoring information to a control server.

According to an embodiment of the present invention, a ultrasound water meter includes: an ultrasound sensor for transmitting and receiving ultrasound waves through a water pipe; a pressure sensor for detecting pressure in the water pipe; a temperature sensor for detecting water surface temperature in the water pipe; a controller for determining water temperature distribution and water movement pattern using information obtained from the ultrasound sensor and the pressure sensor to calculate water flow rate; and a display device for displaying the water flow rate obtained from the controller. The controller includes: a ultrasound measurement device that measures a ultrasound time, wherein the ultrasound time includes a forward ultrasound time and a backward ultrasound time, wherein the forward ultrasound time detects ultrasound in the same direction as a water flowing direction, wherein the backward ultrasound time detects ultrasound in the opposite direction to the water flowing direction; a water flow rate calculator that calculates a water flow rate in the water pipe using a difference between the forward ultrasound time and the backward ultrasound time; a ultrasound speed calculator that calculates a ultrasound speed using the forward ultrasound time and the backward ultrasound time obtained in the ultrasound measurement process; a center water temperature calculator that calculates water temperature T(0) of water located in a center of the water pipe using the ultrasound speed obtained in the ultrasound speed calculation process; a temperature distribution calculator that (i) detects a water surface temperature (Ts) of water located in a surface of the water pipe using a temperature sensor, and (ii) calculates a water temperature distribution T(r) in the water pipe using the water surface temperature, the center water temperature T(0), and a water pipe diameter; a water movement pattern determination device that determines a water movement pattern using the water temperature distribution T(r), a water flow rate distribution, and comparison between a first Reynolds number and a second Reynolds number, wherein the water flow rate distribution is obtained using the ultrasound time and varies depending on the water movement pattern, wherein the first Reynolds number is calculated using an average water flow rate, wherein the second Reynolds number is calculated using a pressure change in the water pipe, wherein the pressure change is obtained using a pressure sensor; and a water flow amount calculator that calculates a water flow amount using a average water flow rate, wherein the average water flow rate varies depending on the water movement pattern.

The water movement pattern determination device may perform of: calculating the water temperature distribution T(r), a water temperature distribution u(r), and the average water flow rate, wherein the water temperature distribution u(r) varies depending on the water movement pattern; calculating a water average water temperature Tm, wherein the water average water temperature Tm varies depending on the water movement pattern; obtaining the first Reynolds number using the average water temperature Tm; obtaining the average water flow rate and the second Reynolds number using the pressure change obtained using the pressure sensor; determining whether a given water movement pattern is a laminar movement or a turbulent movement by comparing the first Reynolds number and the second Reynolds number; and determining the given water movement as a transitional movement flow when the given water movement is neither the laminar movement nor the turbulent movement.

The ultrasound water meter may further include a water leakage monitor. The water leakage monitor performs of: monitoring whether there is no water flow in the water pipe using the water flow rate obtained in the water flow rate calculator; comparing a first pressure (P1) and a second pressure (P2) detected by a pressure sensor, wherein the first pressure (P1) is measured when there is no water flow in the water pipe at the time of initial installation, wherein the second pressure (P2) is measured when there is no water flow in the water pipe at a given point of time; determining whether there is a pressure drop that exceeds a preset reference error value; generating water leak monitoring information when pressure drop exceeds the preset reference error value; and transmitting the water leak monitoring information to a control server.

According to the present invention, before estimating the average water flow rate from which the water flow amount is calculated, the water movement pattern in the water pipe is determined. Then, different water flow rates are obtained from different water movement patterns. The water flow amount can be accurately calculated using the water flow rates as such.

BRIEF DESCRIPTION OF THE DRAWINGS

FIG. 2 shows laminar water movement. FIG. 3 shows turbulent water movement.

FIG. 4 is a flow chart illustrating a process for measuring water flow rate using an ultrasound water meter. FIG. 5 is a flow chart illustrating a process for detecting water leakage.

FIG. 6 is a diagram showing viscosity/density/dynamic viscosity of water according to temperature.

DETAILED DESCRIPTION OF INVENTION

Figure 1:
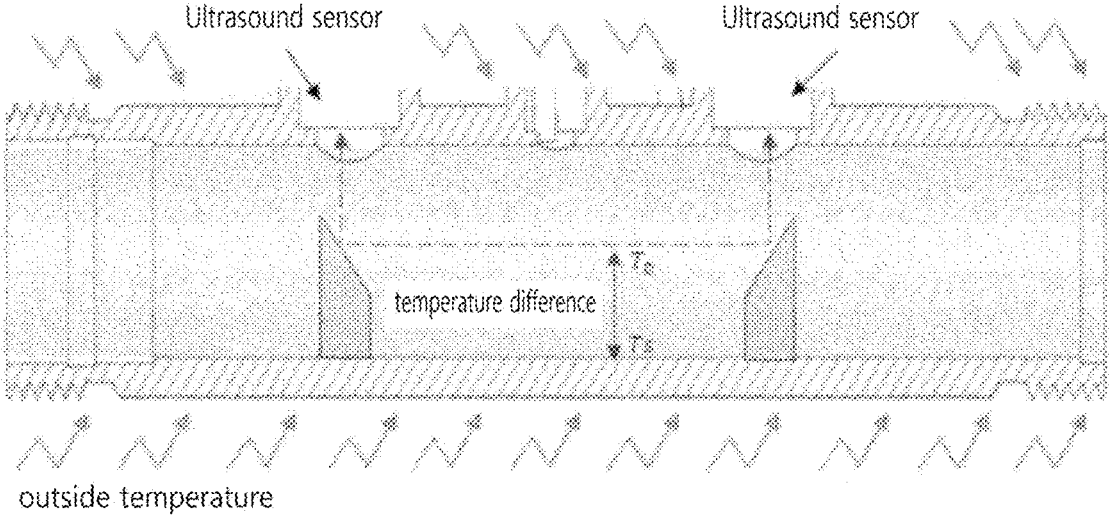
FIG. 1 shows temperature distribution due to the temperature difference between inside and outside of the water pipe.
Figure 2:
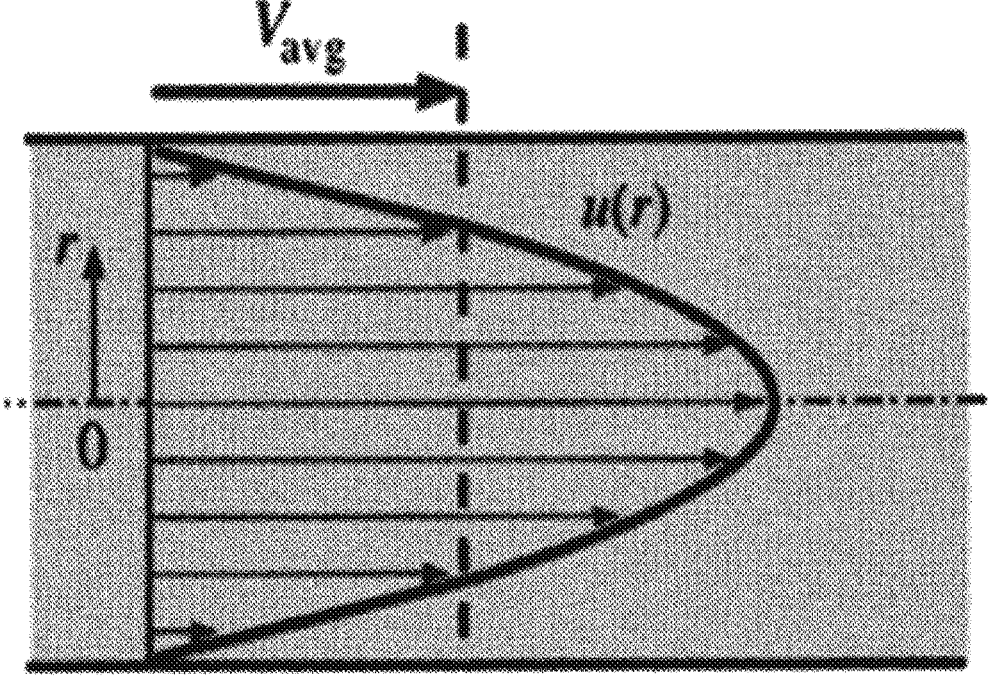
FIGS. 2 and 3 show water flow distribution in a water pipe.
Figure 3:
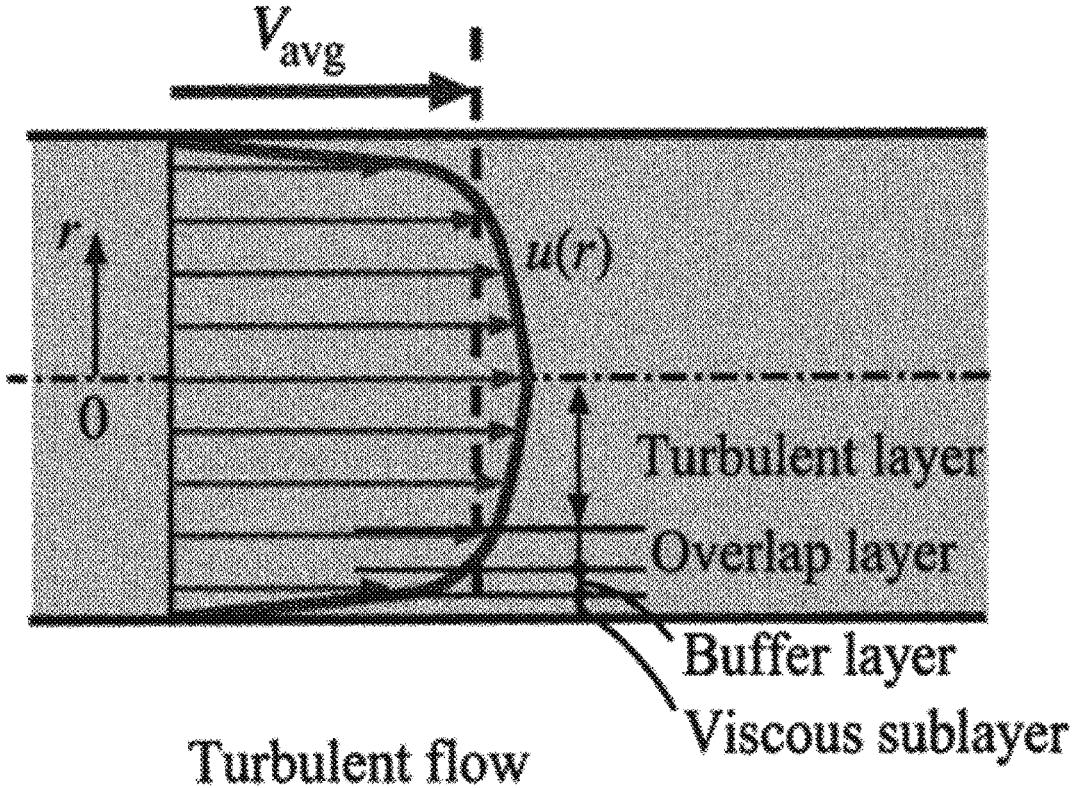

First, the terms used in this specification and claims are general terms selected in consideration of their functions in various embodiments of the present invention. However, these terms may vary depending on the intention of engineers working in the field, legal or technical interpretations, and the emergence of new technologies.

Additionally, some terms may be arbitrarily selected by the applicant. These terms may be interpreted as defined in this specification, and if no specific definition of a term is provided, they may be interpreted based on the overall contents of this specification and common technical knowledge in the relevant technical field.

The terms or words used in the detailed description and claims of the present invention should not be interpreted as limited to their usual or dictionary meanings, but should be interpreted as meanings and concepts that conform to the technical idea of the present invention based on the principle that 'an inventor can appropriately define the concept of a term in order to explain his or her own invention in the best way.'

In addition, it should be understood that the embodiments described in this specification and the configurations illustrated in the drawings are only preferred embodiments of the present invention and do not represent all of the technical ideas of the present invention, and therefore, there may be various equivalents and modified examples that can replace them at the time of filing this application.

Additionally, the same reference numbers or symbols described in each drawing attached to this specification represent parts or components that perform substantially the same function.

For convenience of explanation and understanding, the same reference numbers or symbols are used in different embodiments. That is, even if multiple drawings illustrate components having the same reference number, the multiple drawings do not represent one embodiment.

Additionally, terms including ordinal numbers, such as "first," "second," etc., may be used in this specification and claims to distinguish between components. These ordinals are used to distinguish between identical or similar components, and the use of these ordinals should not be interpreted in a limited way in the meaning of the terms.

For example, components associated with these ordinals should not be interpreted in a restricted manner, such as in the order of use or arrangement, by that number. If necessary, the ordinals may be used interchangeably.

In this specification, singular expressions include plural expressions unless the context clearly indicates otherwise. In this application, it should be understood that terms such as "include" or "comprise" are intended to specify the presence of a feature, number, step, operation, component, part or combination thereof described in the specification, but do not exclude in advance the possibility of the presence or addition of one or more other features, numbers, steps, operations, components, parts or combinations thereof.

Hereinafter, a method for measuring a water flow rate and detecting water leakage according to the present invention will be specifically described with reference to the embodiment illustrated in the attached drawing FIG. 4, which uses an ultrasound water meter and ueses water temperature distribution and pressure change.

Figure 4:
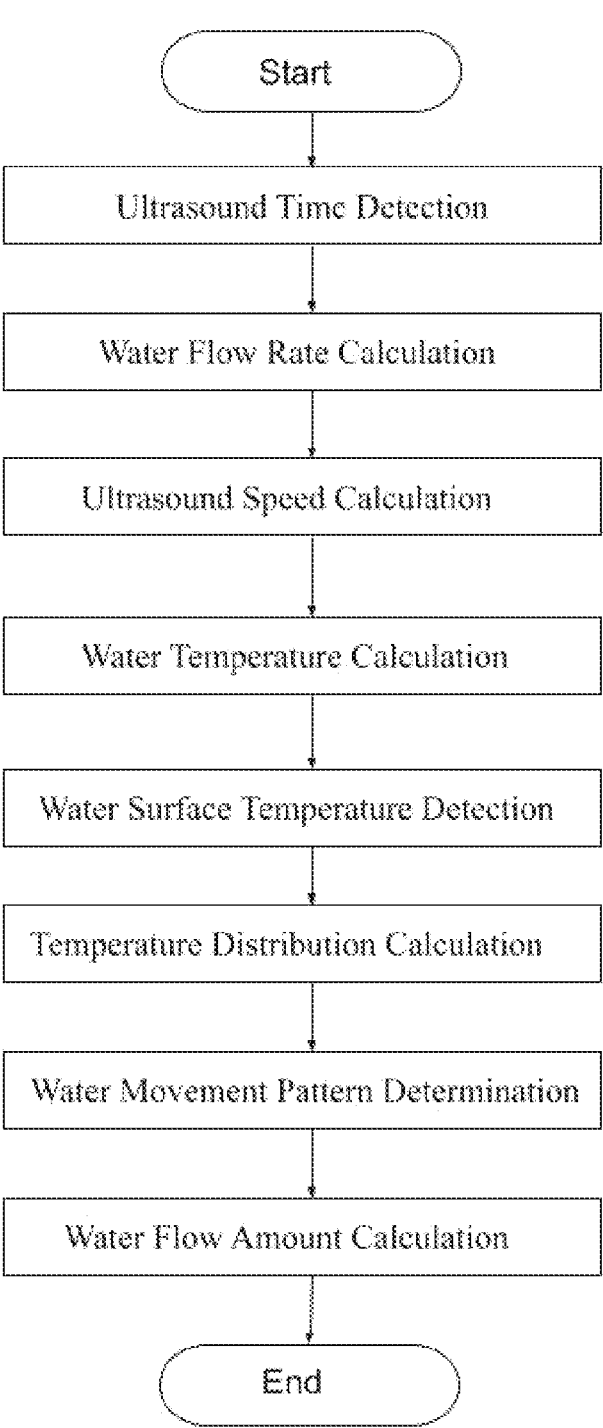
FIGS. 4 and 5 illustrate a method for measuring water flow rate and detecting water leakage using an ultrasound water meter and using water temperature distribution and pressure change according to the present invention.
Figure 5:
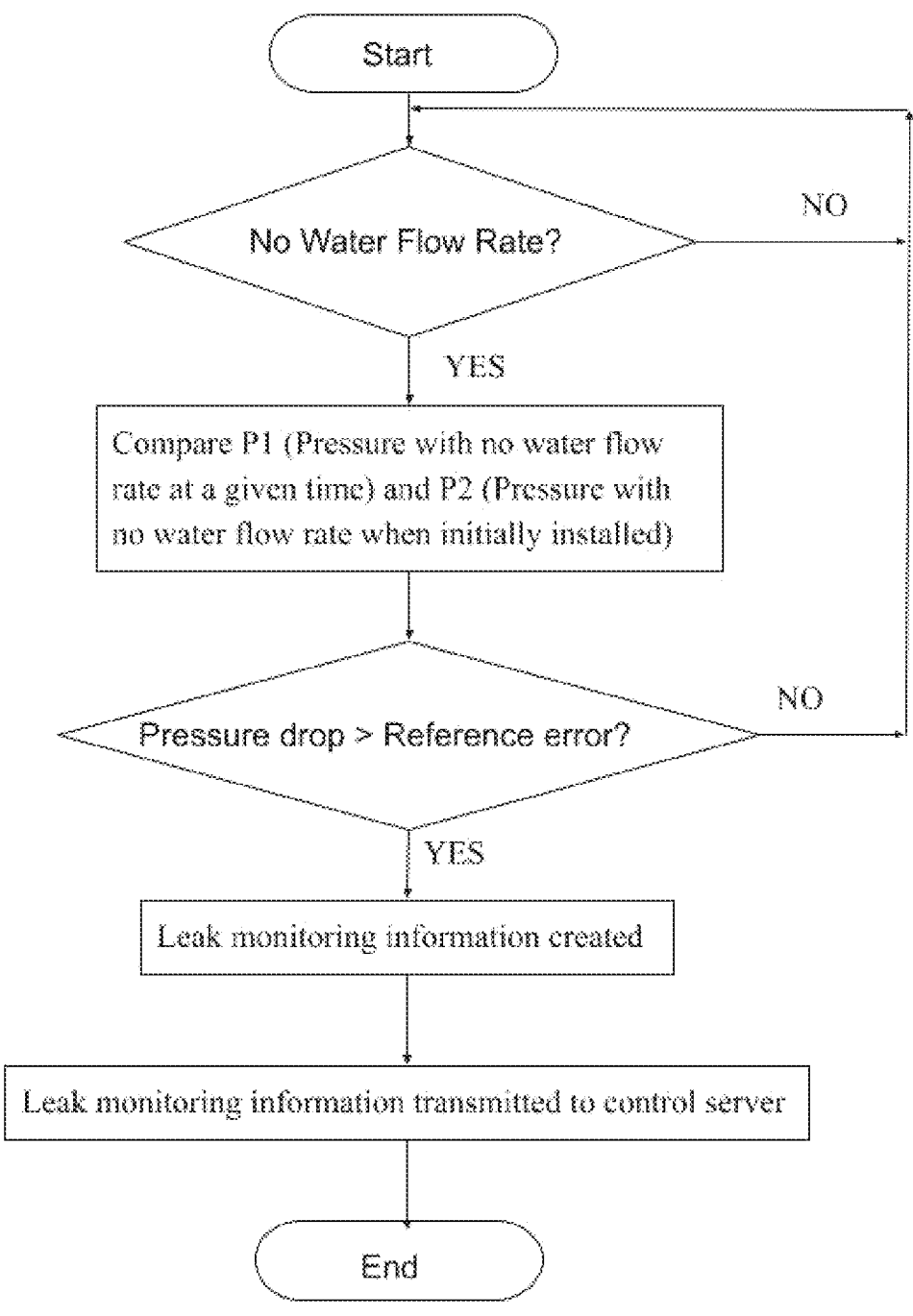

FIG. 4 is a flow chart showing a process of measuring a water flow amount using water temperature distribution and pressure change in an ultrasound water meter according to the present invention. FIG. 5 is a flow chart showing a process of detecting water leakage.

According to an embodiment of the present invention, a method for measuring water flow amount and for detecting water using temperature distribution and pressure change in a ultrasound water meter includes: a ultrasound time measurement process that measures a ultrasound time, wherein the ultrasound time includes a forward ultrasound time and a backward ultrasound time, wherein the forward ultrasound time detects ultrasound moving in the same direction as a water flowing direction, wherein the backward ultrasound time detects ultrasound moving in the opposite direction to the water flowing direction; a water flow rate calculation process that calculates a water flow rate in the water pipe using a difference between the forward ultrasound time and the backward ultrasound time; a ultrasound speed calculation process that calculates a ultrasound speed using the forward ultrasound time and the backward ultrasound time obtained in the ultrasound measurement process; a center water temperature calculation process that calculates water temperature $T(0)$ of water located in a center of the water pipe using the ultrasound speed obtained in the ultrasound speed calculation process; a water surface temperature measurement process that detects a water surface temperature (Ts); a temperature distribution calculation process that calculates a water temperature distribution $T(r)$ in the water pipe using the water surface temperature, the center water temperature $T(0)$, and a water pipe diameter; a water movement pattern determination process that determines a water movement pattern using the water temperature distribution $T(r)$, a water flow rate distribution, and comparison between a first Reynolds number and a second Reynolds number, wherein the water flow rate distribution is obtained using the ultrasound time and varies depending on the water movement pattern, wherein the first Reynolds number is calculated using an average water flow rate, wherein the second Reynolds number is calculated using a pressure change in the water pipe, wherein the pressure change is obtained using a pressure sensor; and a water flow amount calculation process that calculates a water flow amount using the average water flow rate, wherein the average water flow rate varies depending on the water movement pattern.

The water movement pattern determination process includes a first process and a second process. The first process includes: calculating the water temperature distribution $T(r)$, a water temperature distribution $u(r)$, and the average water flow rate, wherein the water temperature distribution $u(r)$ varies depending on the water movement pattern; calculating an average water temperature Tm, wherein the average water temper Tm varies depending on the water movement pattern; obtaining the first Reynolds number using the average water temper Tm; obtaining the average water flow rate and the second Reynolds number using the pressure change obtained using the pressure sensor; and determining whether a given water movement pattern is a laminar movement or a turbulent movement by comparing the first Reynolds number and the second Reynolds number. The second process determines the given water movement as a transitional movement flow when the given water movement is neither the laminar movement nor the turbulent movement.

The method may further include a water leak monitoring process. The water leak monitoring process includes: monitoring whether there is no water flow in the water pipe using the water flow rate obtained in the water flow rate calculation process; comparing a first pressure (P1) and a second pressure (P2) detected by a pressure sensor, wherein the first pressure (P1) is measured when there is no water flow in the water pipe at the time of initial installation, wherein the second pressure (P2) is measured when there is no water flow in the water pipe at a given point of time; determining whether there is a pressure drop that exceeds a preset reference error value; generating water leak monitoring information when a pressure drop exceeds the preset reference error value; and transmitting the water leak monitoring information to a control server.

Hereinafter, the method of measuring water flow amount and of detecting water leaks using an ultrasound water meter and using water temperature distribution and pressure change is described in detail with reference to the attached drawings.

Ultrasound waves can be transmitted forward and backward along the water flow. The difference in arrival times can be used to measure the water flow rate.

The speed of ultrasound waves changes depending on the temperature of the water. Thus, a water central temperature T(0) can be measured through the moving speed of the ultrasound waves in the water.

A temperature sensor can be used to measure temperature of water located at the inner surface of the water pipe, which is called a surface water temperature (Ts). The temperature distribution T(r) in the water pipe is calculated by the following Formula 1 using the center water temperature T(0), the surface water temperature (Ts), and water pipe diameter information.

$$T(r) = \frac{qr_0^2}{4K}\left(1 - \frac{r^2}{r_o^2}\right) + Ts \qquad \text{<Formula 1>}$$

wherein Ts is the water surface temperature,
wherein T(0) is the center water temperature,
wherein $r_0$ is the radius of the water pipe.

Then, the water movement pattern is determined. The water flow amount is calculated considering the water movement pattern is laminar, turbulent, or transitional. Here, the Reynolds number is used to determine the water movement pattern.

To find the Reynolds number, an average water temperature (Tm) is required. To obtain the average water temperature (Tm), water flow rate distribution u(r) and average water flow rate Vavg are required.

The water flow rate distribution u(r) and the average water flow rate Vavg vary depending on the water movement pattern. Thus, different water flow rate distributions u(r) and different average water flow rates Vavg are obtained from different water movement patterns. The average water temperature Tm is calculated using the water temperature distribution T(r), the water flow rate distribution u(r), and the average water flow rate Vavg. Then, the first Reynolds number Re is obtained using the average water temperature Tm.

Afterwards, an average water flow rate and a second Reynolds number Re are calculated using pressure change. The first and the second Reynolds number Re are compared with each other. The water movement pattern can be determined based on using the comparison result.

Here, the process of determining the water movement pattern of a given water is performed as follows. First, it is assumed that the water movement pattern of the given water is laminar. Under the assumption, the first Reynolds number and the second Reynolds number are obtained. Then, whether the water movement pattern of the given water is laminar or turbulent by comparing the first Reynolds number and the second Reynolds number from each other. When the water flow rate of the given water is neither laminar flow nor turbulent, the water movement pattern of a given water can be determined as transitional.

First, when the water movement pattern is laminar, the water flow rate distribution u(r) of laminar movement can be obtained by the following Formula 2.

$$u_{(r)} = u_0\left(1 - \left(\frac{r^2}{r_0}\right)\right) \qquad \text{<Formula 2>}$$

Here, the average water flow rate Vavg is a half of the center water flow rate $u_0$ ($u_0$=umax=2Vavg).

Afterwards, using the average water flow rate Vavg, the water temperature distribution T(r), and the water flow rate distribution u(r), the average temperature Tm is calculated by Formula 3. The kinematic viscosity coefficient of water can be obtained using the water temperature distribution. Then, the first Reynolds number Re is derived by the following Formula 4 when the water movement pattern is laminar.

$$Tm = \frac{2}{V_{avg}r_0^2}\int_0^{r_0} T(r)u(r)dr \qquad \text{<Formula 3>}$$

$$Re_1 = \frac{V_{avg}D}{v} \qquad \text{<Formula 4>}$$

wherein Vavg is the average water flow rate,
wherein v is coefficient of kinematic viscosity,
wherein D is the diameter of the water pipe.

The kinematic viscosity v of water at 4° C. is approximately 95% higher than that of water at 30° C. FIG. 6 shows the kinematic viscosity coefficient v. FIG. 6 shows viscosity/density/dynamic viscosity of water according to temperature.

Then, a confirmation process is performed to confirm whether the water movement patternof the given water is laminar or not. To confirm whether the water movement pattern of the given water is laminar or not, an average water flow rate is obtained by the following Formula 5 which uses pressure change according to Bernoulli's principle. The second Reynolds number is calculated using the average water flow rate. Then, the second Reynolds number is compared with the first Reynolds number.

The following Formulae 5 to 7 represent the process of obtaining the average water flow rate and the second Reynolds number using the pressure change.

$$\Delta P = P_1 - P_2 \qquad \text{<Formula 5>}$$

$$P_1 - P_2 = \frac{32\mu L V_{avg}}{D^2} \qquad \text{<Formula 6>}$$

$$Re_2 = \frac{V_{avg}D}{v} \qquad \text{<Formula 7>}$$

wherein Vavg is the average water flow rate,
wherein μ is coefficient of viscosity,
wherein v is coefficient of kinematic viscosity
wherein D is a diameter of water pipe, wherein L is the length of the water pipe, wherein P1–P2 is a pressure difference.

The first pressure (P1) is measured when there is no water flow in the water pipe at the time of initial installation. The second pressure (P2) is measured when there is no water flow in the water pipe at a given point of time. The first pressure P1 and the second pressure P2 are measured by the pressure sensor.

The water movement pattern can be determined as a laminar movement when the first and second Reynolds numbers are Re≤2300, respectively, and the difference between the first and second Reynolds numbers is within a preset error range. The first Reynolds number is obtained using the water flow rate distribution. The second Reynolds number is obtained using the pressure change.

When the water movement pattern is determined to be laminar flow, a water flow amount is calculated using (i) the average water flow rate applicable to a laminar movement and (ii) the cross-sectional area of the water pipe. Here, the water flow amount=average water flow rate Vavg×cross-sectional area.

When the water movement pattern of a given water is assumed to be turbulent, the water flow rate distribution u(r) and the average water flow rate Vavg of turbulent movement are calculated by the following Formulae 8 and 9, respectively.

$$u_{(r)} = u_0\left(1 - \frac{r}{r_0}\right)^{1/n} \qquad \text{<Formula 8>}$$

$$\text{wherein } n = 7,$$

$$V_{avg} = \frac{2}{r_0^2} \int_0^{r_0} u(r) r \, dr. \qquad \text{<Formula 9>}$$

Afterwards, using the average water flow rate Vavg, the water temperature distribution T(r), and the water flow rate distribution u(r), the average temperature Tm is calculated by Formula 3. Then, the first Reynolds number Re of the given water with turbulent movement pattern is derived using the average temperature Tm.

Then, a confirmation process is performed to confirm whether the water movement pattern of the given water is turbulent or not. To confirm whether the water movement pattern of the given water is turbulent or not, an average water flow rate is obtained by the following Formulae 5-7 which uses pressure change according to Bernoulli's principle. The second Reynolds number is calculated using the average water flow rate. Then, the second Reynolds number is compared with the first Reynolds number by above-mentioned Formulae 8-9. The first Reynolds number is obtained using the water flow rate distribution.

The water flow movement pattern of the given water is determined as turbulent movement when the first and second Reynolds numbers are Re≥4000, respectively, and the difference between the first and second Reynolds numbers is within the preset error range, The water flow amount=average water flow rate Vavg×cross-sectional area.

Here, when the water flow movement pattern of the given water is turbulent, the inner surface roughness of the water pipe must be taken into account when the formulae are applied.

However, the inner surface of a typical water pipe is very smooth. Thus, the inner surface roughness of the water pipe affects no substantial impact when the formulae are applied.

When the water flow movement pattern of the given water is neither laminar nor turbulent, the water flow movement pattern of the given water is determined as being transitional. When the water flow movement pattern of the given water is transitional, the water flow rate distribution u(r) and the average water flow rate Vavg are obtained using the Formulae 8-9. Here, n<7 (n is an integer).

Afterwards, using the average water flow rate Vavg, the water temperature distribution T(r), and the water flow rate distribution u(r), the average temperature Tm is calculated by Formula 3. Then, the first Reynolds number Re of the given water with turbulent movement pattern is derived using the average temperature Tm.

An average water flow rate for the turbulent movement is obtained by the Formulae 5-7 which uses pressure change according to Bernoulli's principle. The second Reynolds number is calculated using the average water flow rate. Then, the second Reynolds number is compared with the first Reynolds number.

The calculation is continuously repeated by changing the n value until (i) the first Reynolds number and the second Reynolds number are 2300⟨Re⟨4000, respectively, and (ii) the difference between the first and second Reynolds numbers is within the preset error range. Once the n value is derived, a water flow rate for transitional movement is calculated. The water flow amount=average water flow rate Vavg×cross-sectional area.

Water leak monitoring process is performed by monitoring whether there is no water flow in the water pipe using the water flow rate. The water flow rate is obtained using the ultrasound sensor; and comparing the first pressure (P1) and the second pressure (P2) detected by a pressure sensor. The first pressure (P1) is measured when there is no water flow in the water pipe at the time of initial installation. The second pressure (P2) is measured when there is no water flow in the water pipe at a given point of time.

The comparison results are continuously monitored to see if there is a pressure drop that exceeds a preset error value. When the pressure drop exceeds a preset error value, a leak from the water meter (outdoor) can be suspected. In this case, leak monitoring information is transmitted to the control server as leak monitoring information, and compared and analyzed with other pressure values of water which are supplied with the same water pressure to confirm whether there is an actual leak. The information transmitted to the control server is pressure value measured by the pressure sensor and may include water flow rate information.

As described above, when water leakage monitoring information is received from a water meter, the control server can remotely lock a valve of the water meter and re-measure the pressure. Then, the re-measured pressure values are compared and analyzed with other pressure values of water which are supplied with the same water pressure to confirm whether there is an actual leak.

According to an embodiment of the present invention, an ultrasound water meter for measuring water flow amount and for detecting water leakage using the temperature distribution and the pressure change is configured as follows.

Figure 7:
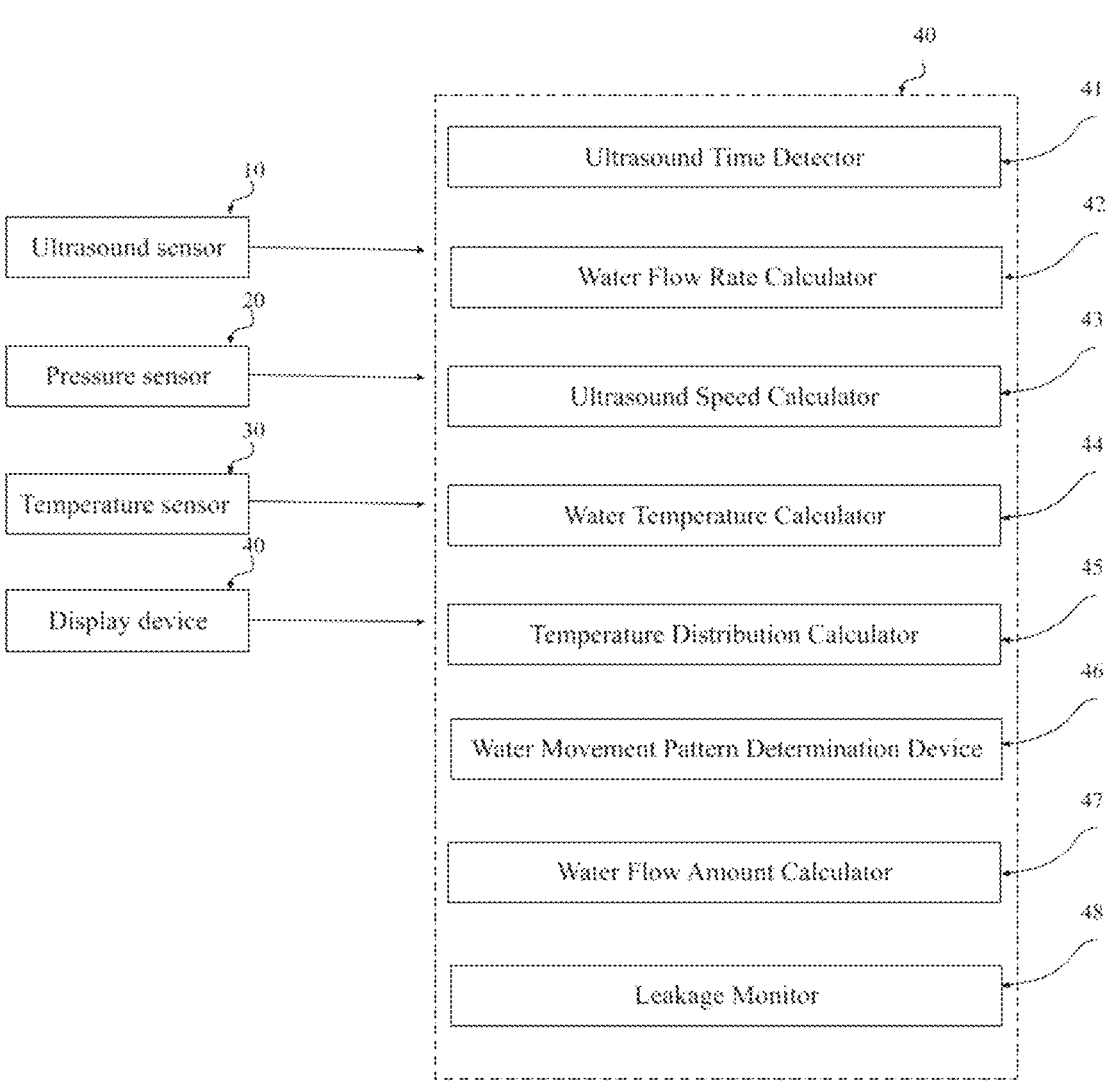
FIG. 7 is a block diagram showing configuration of an ultrasound water meter of the present invention.
Figure 8:
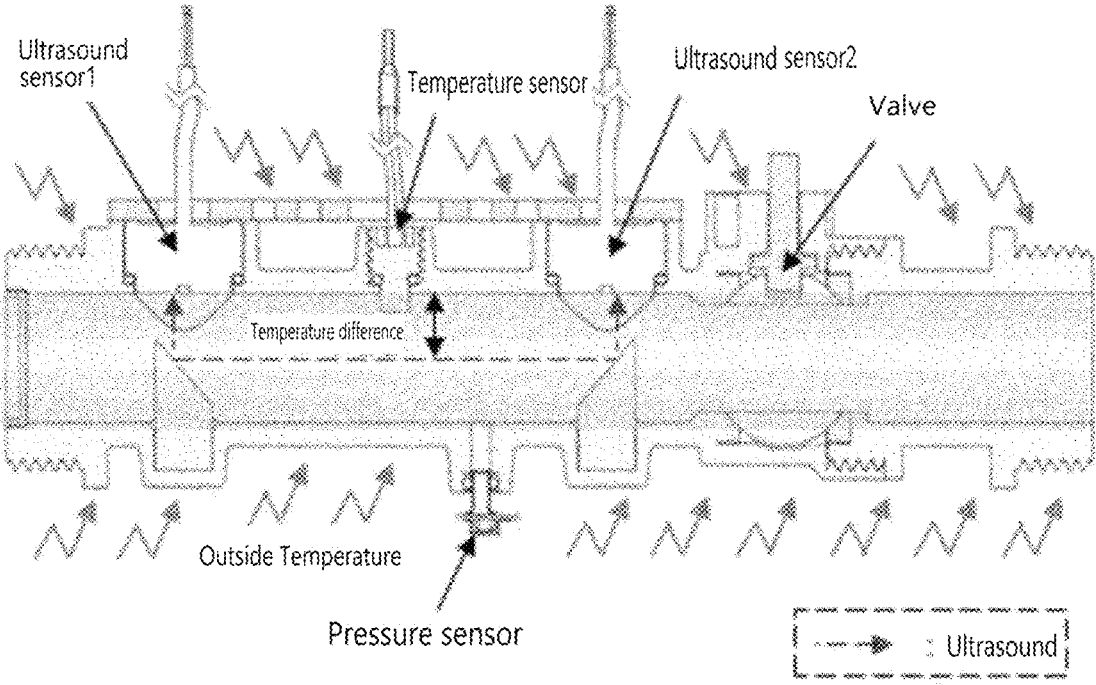
FIG. 8 shows an embodiment of configuration within a water pipe according to the present invention.

FIG. 7 is a block diagram showing configuration of an ultrasound water meter of the present invention. FIG. 8 shows an embodiment of configuration within a water pipe according to the present invention.

The ultrasound water meter of the present invention includes: an ultrasound sensor (10) for transmitting and receiving ultrasound waves through a water pipe; a pressure sensor (20) for detecting pressure in the water pipe; a temperature sensor (30) for detecting water surface temperature in the water pipe; a controller (40) for determining water temperature distribution and water movement pattern using information obtained from the ultrasound sensor and the pressure sensor to calculate water flow rate; and a display device (50) for displaying the water flow rate obtained from the controller.

The controller (40) includes: a ultrasound measurement device (41) that measures a ultrasound time, wherein the ultrasound time includes a forward ultrasound time and a backward ultrasound time, wherein the forward ultrasound time detects ultrasound in the same direction as a water flowing direction, wherein the backward ultrasound time detects ultrasound in the opposite direction to the water flowing direction; a water flow rate calculator (42) that calculates a water flow rate in the water pipe using a difference between the forward ultrasound time and the backward ultrasound time; a ultrasound speed calculator (43) that calculates a ultrasound speed using the forward ultrasound time and the backward ultrasound time obtained in the ultrasound measurement process; a center water temperature calculator (44) that calculates water temperature T(0) of water located in a center of the water pipe using the ultrasound speed obtained in the ultrasound speed calculation process; a temperature distribution calculator (45) that (i) detects a water surface temperature (Ts) of water located in a surface of the water pipe using a temperature sensor and (ii) calculates a water temperature distribution T(r) in the water pipe using the water surface temperature, the center water temperature T(0), and a water pipe diameter; a water movement pattern determination device (46) that determines a water movement pattern using the water temperature distribution T(r), a water flow rate distribution, and comparison between a first Reynolds number and a second Reynolds number, wherein the water flow rate distribution is obtained using the ultrasound time and varies depending on the water movement pattern, wherein the first Reynolds number is calculated using an average water flow rate, wherein the second Reynolds number is calculated using a pressure change in the water pipe, wherein the pressure change is obtained using a pressure sensor; and a water flow amount calculator (47) that calculates a water flow amount using a average water flow rate, wherein the average water flow rate varies depending on the water movement pattern.

The water movement pattern determination device (46) performs of: calculating the water temperature distribution T(r), a water temperature distribution u(r), and the average water flow rate, wherein the water temperature distribution u(r) varies depending on the water movement pattern; calculating a water average water temperature Tm, wherein the water average water temperature Tm varies depending on the water movement pattern; obtaining the first Reynolds number using the average water temperature Tm; obtaining the average water flow rate and the second Reynolds number using the pressure change obtained using the pressure sensor; determining whether a given water movement pattern is a laminar movement pattern or a turbulent movement pattern by comparing the first Reynolds number and the second Reynolds number; and determining the given water movement as a transitional movement flow when the given water movement is neither the laminar movement nor the turbulent movement.

The controller (40) may further includes a water leakage monitor which performs of: monitoring whether there is no water flow in the water pipe using the water flow rate obtained in the water flow rate calculator; comparing a first pressure (P1) and a second pressure (P2) detected, wherein the first pressure (P1) is measured when there is no water flow in the water pipe at the time of initial installation, wherein the second pressure (P2) is measured by a pressure sensor when there is no water flow in the water pipe at a given point of time; determining whether there is a pressure drop that exceeds a preset reference error value; generating water leak monitoring information when pressure drop exceeds the preset reference error value; and transmitting the water leak monitoring information to a control server.

The controller (40) of the ultrasound water meter measures the center water temperature T(0) through the speed of ultrasound waves, and measures the surface water temperature (Ts) located on the inner surface of the water pipe using the value input from the temperature sensor (30).

Using the center water temperature T(0), the surface water temperature (Ts), and water pipe diameter information, the water temperature distribution T(r) in the water pipe is calculated by the Formula 1 shown above.

Afterwards, the Reynolds number is used to determine the water movement pattern. The water flow amount is calculated corresponding to respective water movement patterns, i.e., laminar, turbulent, and transitional movement patterns.

To obtain the Reynolds numbers, the average water temperature Tm is required. To obtain the average water temperature Tm, the water flow rate distribution u(r) and the average water flow rate Vavg are required.

Water flow rate distributions u(r) and the average water flow rates Vavg, which are corresponding to respective water movement patterns, are obtained. Then, the average water temperature Tm is obtained using the water flow rate distributions u(r) and the average water flow rates Vavg. Using the water flow rate distributions u(r) and the average water flow rates Vavg, obtained above, the average water temperature Tm is calculated. Then, the first Reynolds number Re is obtained using the average water temperature Tm.

Afterwards, the average water flow rate and the second Reynolds number Re are calculated using the pressure change. Then, the first and the second Reynolds numbers are compared with each other to determine the water movement pattern of the given water.

Here, the process of determining the water movement pattern of a given water is performed as follows. First, it is assumed that the water movement pattern of the given water is laminar. Under the assumption, the first Reynolds number and the second Reynolds number are obtained. Then, whether the water movement pattern of the given water is laminar or turbulent by comparing the first Reynolds number and the second Reynolds number from each other. When the water flow rate of the given water is neither laminar flow nor turbulent, the water movement pattern of a given water can be determined as transitional.

First, when the water movement pattern is laminar, the water flow rate distribution u(r) of laminar movement can be obtained by the Formula 2 presented above. Here, the average water flow rate Vavg is a half of the center water flow rate $u_0$ ($u_0$=umax=2Vavg).

Afterwards, using the average water flow rate Vavg, the water temperature distribution T(r), and the water flow rate distribution u(r), the average temperature Tm is calculated by Formula 3. The kinematic viscosity coefficient of water can be obtained using the water temperature distribution. Then, the first Reynolds number Re applicable to the water movement pattern is derived by the following Formula 4.

Then, a confirmation process is performed to confirm whether the water movement pattern of the given water is laminar or not. To confirm whether the water movement pattern of the given water is laminar or not, an average water flow rate is obtained by the following Formula 5 which uses pressure change according to Bernoulli's principle. The second Reynolds number is calculated using the average water flow rate. Then, the second Reynolds number is compared with the first Reynolds number.

The water movement pattern can be determined as a laminar movement when the first and second Reynolds numbers are Re≤2300, respectively, and the difference between the first and second Reynolds numbers is within a preset error range. The first Reynolds number is obtained using the water flow rate distribution. The second Reynolds number is obtained using the pressure change.

When the water movement pattern is determined to be laminar flow, a water flow amount iis calculated using (i) the average water flow rate applicable to a laminar movement and (ii) the cross-sectional area of the water pipe. Here, the water flow amount=average water flow rate Vavg×cross-sectional area.

When the water movement pattern of a given water is assumed to be turbulent, the water flow rate distribution u(r) and the average water flow rate Vavg of turbulent movement are calculated by the Formulae 8 and 9 presented above.

Afterwards, using the average water flow rate Vavg, the water temperature distribution T(r), and the water flow rate distribution u(r), the average temperature Tm is calculated by Formula 3. Then, the first Reynolds number Re of the given water with turbulent movement pattern is derived using the average temperature Tm.

Then, a confirmation process is performed to confirm whether the water movement pattern of the given water is turbulent or not. To confirm whether the water movement pattern of the given water is turbulent or not, an average water flow rate is obtained by the Formulae 5-7 which uses pressure change according to Bernoulli's principle. The second Reynolds number is calculated using the average water flow rate. Then, the second Reynolds number is compared with the first Reynolds number by above-mentioned Formulae 8-9. The first Reynolds number is obtained using the water flow rate distribution.

The water flow movement pattern of the given water is determined as turbulent movement when the first and second Reynolds numbers are Re≥4000, respectively, and the difference between the first and second Reynolds numbers is within the preset error range. The water flow amount=average water flow rate Vavg×cross-sectional area.

When the water flow movement pattern of the given water is neither laminar nor turbulent, the water flow movement pattern of the given water is determined as being transitional. When the water flow movement pattern of the given water is transitional, the water flow rate distribution u(r) and the average water flow rate Vavg are obtained using the Formulae 8-9. Here, n<7 (n is an integer).

Afterwards, using the average water flow rate Vavg, the water temperature distribution T(r), and the water flow rate distribution u(r), the average temperature Tm is calculated by Formula 3. Then, the first Reynolds number Re of the given water with turbulent movement pattern is derived using the average temperature Tm.

An average water flow rate for the turbulent movement is obtained by the Formulae 5-7 which uses pressure change according to Bernoulli's principle. The second Reynolds number is calculated using the average water flow rate. Then, the second Reynolds number is compared with the first Reynolds number.

The calculation is continuously repeated by changing the n value until (i) the first Reynolds number and the second Reynolds number are 2300⟨Re⟨4000, respectively, and (ii)

the difference between the first and second Reynolds numbers is within the preset error range. Once the n value is derived, a water flow rate for transitional movement is calculated. The water flow amount=average water flow rate Vavg×cross-sectional area.

The water flow rate is calculated using the average water flow rate which changes according to the water movement pattern. Specifically, the water movement pattern is determined about whether the water movement pattern is laminar, turbulent, or transitional. Then, the average water rate is obtained which is applicable to the water movement pattern. The water flow amount can be more precisely measured by using the average water rate.

The water leakage monitor (48) of the controller (40) performs of: monitoring whether there is no water flow in the water pipe using the water flow rate obtained in the water flow rate calculator; comparing a first pressure (P1) and a second pressure (P2) detected, wherein the first pressure (P1) is measured when there is no water flow in the water pipe at the time of initial installation, wherein the second pressure (P2) is measured by a pressure sensor when there is no water flow in the water pipe at a given point of time; determining whether there is a pressure drop that exceeds a preset reference error value.

The comparison results are continuously monitored to see if there is a pressure drop that exceeds a preset error value. When the pressure drop exceeds a preset error value, a leak from the water meter (outdoor) can be suspected. In this case, leak monitoring information is transmitted to the control server as leak monitoring information, and compared and analyzed with other pressure values of water which are supplied with the same water pressure to confirm whether there is an actual leak. The As described above, when water leakage monitoring information is received from a water meter, the control server can remotely lock a valve of the water meter and re-measure the pressure. Then, the re-measured pressure values are compared and analyzed with other pressure values of water which are supplied with the same water pressure to confirm whether there is an actual leak.

The ultrasound water meter comprises an outdoor water leakage monitoring means, which includes: a water flow rate calculator that calculates a water flow rate in the water pipe using ultrasound time; a pressure sensor for measuring pressure in the water pipe; and a water leakage monitor.

The water leakage monitor performs of: monitoring whether there is no water flow in the water pipe using the water flow rate obtained in the water flow rate calculator; comparing a first pressure (P1) and a second pressure (P2) detected, wherein the first pressure (P1) is measured when there is no water flow in the water pipe at the time of initial installation, wherein the second pressure (P2) is measured by a pressure sensor when there is no water flow in the water pipe at a given point of time; determining whether there is a pressure drop that exceeds a preset reference error value; generating water leak monitoring information when pressure drop exceeds the preset reference error value; and transmitting the water leak monitoring information to a control server.

When water leakage monitoring information is received from a water meter, the control server can remotely lock a valve of the water meter and re-measure the pressure by transmitting a remote control signal to the ultrasound water meter. Then, the re-measured pressure values are compared and analyzed with other pressure values of water which are supplied with the same water pressure to confirm whether there is an actual leak.

In this way, the ultrasound water meter according to an embodiment of the present invention can calculate an accurate water flow rate through the average water flow rate which changes according to the water movement pattern. In addition, the ultrasound water meter can detect outdoor water leaks by utilizing pressure changes. The pressure changes can be measured by a pressure sensor. The pressure sensor may be included in the ultrasound sensor.

A method for measuring water flow amount and for detecting water according to an embodiment of the present invention includes: a ultrasound time measurement process that measures a ultrasound time, wherein the ultrasound time includes a forward ultrasound time and a backward ultrasound time, wherein the forward ultrasound time detects ultrasound moving in the same direction as a water flowing direction, wherein the backward ultrasound time detects ultrasound moving in the opposite direction to the water flowing direction; a water flow rate calculation process that calculates a water flow rate in the water pipe using a difference between the forward ultrasound time and the backward ultrasound time; a water flow amount calculation process that calculates a water flow amount using the water flow rate, and a water leakage monitoring process. The water leakage monitoring process performs of: monitoring whether there is no water flow in the water pipe using the water flow rate obtained in the water flow rate calculation process; comparing a first pressure (P1) and a second pressure (P2) detected by a pressure sensor, wherein the first pressure (P1) is measured when there is no water flow in the water pipe at the time of initial installation, wherein the second pressure (P2) is measured when there is no water flow in the water pipe at a given point of time; determining whether there is a pressure drop that exceeds a preset reference error value; generating water leak monitoring information when a pressure drop exceeds the preset reference error value; and transmitting the water leak monitoring information to a control server.

A ultrasound water meter for measuring water flow amount and for detecting water according to an embodiment of the present invention includes: an ultrasound sensor transmitting and receiving ultrasound waves through a water pipe; a pressure sensor detecting pressure in the water pipe; a temperature sensor detecting water surface temperature in the water pipe; and a controller; and a water leakage monitor. The controller performs: detecting ultrasound time using information from the ultrasound sensor; calculating water flow rate in the water pipe using the ultrasound time; and calculating water flow amount using the water flow rate.

The water leakage monitor performs of: monitoring whether there is no water flow in the water pipe using the water flow rate; comparing a first pressure (P1) and a second pressure (P2) detected by a pressure sensor, wherein the first pressure (P1) is measured when there is no water flow in the water pipe at the time of initial installation, wherein the second pressure (P2) is measured when there is no water flow in the water pipe at a given point of time; determining whether there is a pressure drop that exceeds a preset reference error value; generating water leak monitoring information when a pressure drop exceeds the preset reference error value; and transmitting the water leak monitoring information to a control server.

Although the preferred embodiments of the present invention have been illustrated and described above, the present invention is not limited to the specific embodiments described above, and various modifications may be made by those skilled in the art without departing from the gist of the present invention as claimed in the claims. Furthermore, such modifications should not be individually understood from the technical idea or prospect of the present invention.

What is claimed is:

1. A ultrasound water meter, comprising:
an ultrasound sensor for transmitting and receiving ultrasound waves through a water pipe,
a pressure sensor for detecting pressure in the water pipe,
a temperature sensor for detecting water surface temperature in the water pipe, and
a controller for determining water temperature distribution and water movement pattern using information obtained from the ultrasound sensor and the pressure sensor to calculate a water flow rate,
wherein the controller includes:
a ultrasound measurement device that measures a ultrasound time, wherein the ultrasound time includes a forward ultrasound time and a backward ultrasound time, wherein the forward ultrasound time detects ultrasound in the same direction as a water flowing direction, wherein the backward ultrasound time detects ultrasound in the opposite direction to the water flowing direction;
a water flow rate calculator that calculates the water flow rate in the water pipe using a difference between the forward ultrasound time and the backward ultrasound time;
a ultrasound speed calculator that calculates a ultrasound speed using the forward ultrasound time and the backward ultrasound time obtained in the ultrasound measurement device;
a center water temperature calculator that calculates water temperature T(0) of water located in a center of the water pipe using the ultrasound speed, wherein the ultrasound speed is obtained in the ultrasound speed calculation process and varies depending on water temperature;
a temperature distribution calculator that (i) detects a water surface temperature (Ts) of water located in a surface of the water pipe using a temperature sensor, and (ii) calculates a water temperature distribution T(r) in the water pipe using the water surface temperature (Ts), the center water temperature T(0), and a water pipe diameter;
a water movement pattern determination device that determines a water movement pattern using the water temperature distribution T(r), a water flow rate distribution, and comparison between a first Reynolds number and a second Reynolds number, wherein the water flow rate distribution is obtained using the ultrasound time and varies depending on the water movement pattern, wherein the first Reynolds number is calculated using an average water flow rate, wherein the second Reynolds number is calculated using a pressure change in the water pipe, wherein the pressure change is obtained using a pressure sensor; and
a water flow amount calculator that calculates a water flow amount using a average water flow rate, wherein the average water flow rate varies depending on the water movement pattern,
wherein the water temperature distribution T(r) is calculated from the following Formula 1:

$$T(r) = \frac{qr_0^2}{4K}\left(1 - \frac{r^2}{r_o^2}\right) + Ts \qquad \langle\text{Formula 1}\rangle$$

wherein Ts is the water surface temperature, wherein $r_0$ is the radius of the water pipe, wherein, when r=0, the center water temperature T(0) is presented by the following formula:

$$T(0) = \frac{qr_0^2}{4K} + T_s$$

wherein q is heat generation rate, wherein K is thermal conductivity, wherein the ultrasound water meter further comprises: an outdoor water leakage monitor; and a control server, wherein the outdoor water leakage monitor (i) monitors whether there is no water flow in the water pipe using the water flow rate obtained in the water flow rate calculator, (ii) compares a first pressure (P1) and a second pressure (P2) detected, wherein the first pressure (P1) is measured when there is no water flow in the water pipe at the time of initial installation, wherein the second pressure (P2) is measured by a pressure sensor when there is no water flow in the water pipe at a given point of time; (iii) determines whether there is a pressure drop that exceeds a preset reference error value; (iv) generates water leak monitoring information when pressure drop exceeds the preset reference error value; and (v) transmits the water leak monitoring information to a control server, wherein control server receives the water leak monitoring information and remotely locks a valve of the ultrasound water meter.

2. The ultrasound water meter of claim 1, wherein the water movement pattern determination device performs:

calculating the water temperature distribution T(r), a water temperature distribution u(r), and the average water flow rate, wherein the water temperature distribution u(r) varies depending on the water movement pattern;

calculating a water average water temperature Tm, wherein the water average water temperature Tm varies depending on the water movement pattern;

obtaining the first Reynolds number using the average water temperature Tm;

obtaining the average water flow rate and the second Reynolds number using the pressure change obtained using the pressure sensor;

determining whether a given water movement pattern is a laminar movement pattern or a turbulent movement pattern by comparing the first Reynolds number and the second Reynolds number; and determining the given water movement as a transitional movement pattern when the given water movement is neither the laminar movement nor the turbulent movement.

3. The ultrasound water meter of claim 2, wherein, in the water movement pattern determination device, the average water temperature Tm is calculated from the following Formula 3:

$$Tm = \frac{2}{V_{avg} r_0^2} \int_0^{r_0} T(r)u(r)dr \qquad \text{<Formula 3>}$$

wherein the first Reynolds number Re is calculated from the following Formula 4:

$$Re_1 = \frac{V_{avg}D}{v} \qquad \text{<Formula 4>}$$

wherein Vavg is the average water flow rate, wherein v is coefficient of kinematic viscosity, wherein D is the diameter of the water pipe.

4. The ultrasound water meter of claim 1, wherein, in the water movement pattern determination device, the average water flow rate and the second Reynolds number are calculated using the following Formulae 5-7:

$$\Delta P = P_1 - P_2 \qquad \text{<Formula 5>}$$

$$P_1 - P_2 = \frac{32\mu L V_{avg}}{D^2} \qquad \text{<Formula 6>}$$

$$Re_2 = \frac{V_{avg}D}{v} \qquad \text{<Formula 7>}$$

wherein Vavg is the average water flow rate, wherein u is coefficient of viscosity, wherein v is coefficient of kinematic viscosity wherein D is a diameter of water pipe, wherein L is the length of the water pipe, wherein P1–P2 is a pressure difference.

5. The ultrasound water meter of claim 3, wherein, when the water movement pattern is determined as a laminar movement, the water flow rate distribution u(r) is calculated by the following Formula 2, wherein the average water flow rate $V_{avg}$ is half of the water center flow rate $u_0$ ($u_0 - u_{max} = 2V_{avg}$):

$$u_{(r)} = u_0 \left(1 - \left(\frac{r}{r_0}\right)^2\right). \qquad \text{<Formula 2>}$$

6. The ultrasound water meter of claim 3, wherein, when the water movement pattern is the turbulent movement, the water movement pattern determination device performs:

calculating the water flow rate distribution u(r) by the following Formula 8, calculating the average water flow rate $V_{avg}$ by the following Formula 9, $$u_{(r)} = u_0 \left(1 - \frac{r}{r_0}\right)^{1/n} \qquad \text{<Formula 8>}$$

wherein n = 7, $$V_{avg} = \frac{2}{r_0^2} \int_0^{r_0} u(r)r dr. \qquad \text{<Formula 9>}$$

7. The ultrasound water meter of claim 3, wherein, when the water movement pattern is the transitional movement, the water movement pattern determination device performs of:

calculating the water flow rate distribution u(r) by the following Formula 8, calculating the average water flow rate $V_{avg}$ by the following Formula 9, $$u_{(r)} = u_0 \left(1 - \frac{r}{r_0}\right)^{1/n} \qquad \text{<Formula 8>}$$

wherein n<7 (n is integer), $$V_{avg} = \frac{2}{r_0^2} \int_0^{r_0} u(r) r \, dr. \qquad \text{<Formula 9>}$$

8. The ultrasound water meter of claim 1, wherein the water movement pattern determination device determines the water flow movement pattern as a laminar movement when the first and second Reynolds numbers are Re≤2300, respectively, and the difference between the first and second Reynolds numbers is within a preset error range, wherein the water movement pattern determination device determines the water flow movement pattern as turbulent movement when the first and second Reynolds numbers are Re≥4000, respectively, and the difference between the first and second Reynolds numbers is within the preset error range, wherein the water movement pattern determination device determines the water flow movement pattern as turbulent movement when the first and second Reynolds numbers are 2300⟨ Re⟨ 4000, respectively, and the difference between the first and second Reynolds numbers is within the preset error range, wherein the number n keeps changing until the difference between the first and second Reynolds numbers falls within the preset error range.

9. The ultrasound water meter of claim 1, further comprising:

a display device for displaying the water flow rate obtained from the controller.

\* \* \* \* \*